United States Patent
Kohli et al.

(10) Patent No.: US 9,882,881 B2
(45) Date of Patent: Jan. 30, 2018

(54) SYSTEM AND METHOD FOR PROVIDING PERSONALIZED AND CONFIDENTIAL DATA MANAGEMENT AND SHARING SERVICES

(71) Applicants: Jyoth Singh Kohli, Hyderabad (IN); Parminder Singh Kohli, Hyderabad (IN)

(72) Inventors: Jyoth Singh Kohli, Hyderabad (IN); Parminder Singh Kohli, Hyderabad (IN)

(*) Notice: Subject to any disclaimer, the term of this patent is extended or adjusted under 35 U.S.C. 154(b) by 214 days.

(21) Appl. No.: 14/897,653

(22) PCT Filed: May 21, 2014

(86) PCT No.: PCT/IB2014/061589
§ 371 (c)(1),
(2) Date: Dec. 11, 2015

(87) PCT Pub. No.: WO2014/203096
PCT Pub. Date: Dec. 24, 2014

(65) Prior Publication Data
US 2016/0119295 A1 Apr. 28, 2016

(30) Foreign Application Priority Data
Jun. 17, 2013 (IN) .................. 2617/CHE/2013

(51) Int. Cl.
*G06F 17/30* (2006.01)
*H04L 29/06* (2006.01)
(Continued)

(52) U.S. Cl.
CPC ...... *H04L 63/0428* (2013.01); *G06F 21/6218* (2013.01); *G06Q 10/10* (2013.01);
(Continued)

(58) Field of Classification Search
None
See application file for complete search history.

(56) References Cited

U.S. PATENT DOCUMENTS 9,317,712 B2 * 4/2016 Karaoguz .............. G05B 13/02
2008/0137857 A1 * 6/2008 Bellare .................. H04L 9/085
380/255
(Continued)

*Primary Examiner* — Kenny Lin

(57) ABSTRACT

A method and system for providing personalized and confidential data management and sharing services to the subscriber are disclosed. The method includes enabling an individual to register with a personalized and confidential data management and sharing system to become a subscriber. The subscriber may enter personalized and confidential data and designate recipients to receive personalized and confidential data and upload photographs of the recipients. The method includes determining the existence of the subscriber by tracking the visiting/login history of the subscriber at regular intervals, transmitting communication messages to the personalized digital account of the subscriber upon identifying the subscriber not logging in to the subscriber account and establishing a voice call with the contact number of the subscriber and/or the affiliates to confirm the demise/existence of the subscriber. The method includes confirming the demise of the subscriber and transmitting a link and password and confirming the identity of the designated recipients through video conference to view or download the data.

9 Claims, 5 Drawing Sheets

(51) Int. Cl.
*G06Q 10/10* (2012.01)
*G06F 21/62* (2013.01)

(52) U.S. Cl.
CPC ........... *G06Q 10/109* (2013.01); *H04L 63/08* (2013.01); *G06F 2221/2101* (2013.01)

(56) References Cited

U.S. PATENT DOCUMENTS

2009/0254971 A1* 10/2009 Herz ................ G06Q 10/10 726/1
2012/0102329 A1* 4/2012 Mittal ................ G06F 21/10 713/176

\* cited by examiner

SYSTEM AND METHOD FOR PROVIDING PERSONALIZED AND CONFIDENTIAL DATA MANAGEMENT AND SHARING SERVICES

TECHNICAL FIELD

The present disclosure relates to data management systems and methods. More particularly, the present disclosure relates to a system and method for providing personalized and confidential data management and sharing services.

BACKGROUND

Generally, unfortunate and sudden incidents may result in the death of a person which cannot be anticipated by anyone. The death of a person may result in many secrets, last wishes, wills and testaments and the like being untold to the beloved ones, family, and friends and also to any person who deserves to be informed. Usually, personalized and confidential data including but not limited to wills and testaments, last words to loved ones, lessons about living, confessions, secret messages, and any other information pertaining to legal declaration of property, assets, profit shares, liabilities, details of insurance policies, bank account details, passwords of various digital accounts, and the like may remain untold to beloved ones upon the death of a person. Furthermore, there may be certain things that a person may want to inform to various people but not at that particular point in time. The person may wish to inform those things at a particular time in the future for whatever reasons. But due to the sudden death of the person, such information may remain untold forever.

The most logical solution to the above mentioned problem is that a person can write down important, personal and confidential information and various other facts in a notebook or a diary. However, a major drawback of this is that on the demise of the person, the diary or the notebook can go into wrong hands and be read by an unintended recipient. Also, there is a high chance that the notebook or diary can be accessed by others even while the person is alive and thus the important information can be read by others, which the person may not want. A few new technologies are enabled to produce posthumous communication by storing important information while the person is alive and transmitting the information to the recipients designated by the person after the death of the person. The main drawback associated with these technologies is that someone or the other, apart from the person himself/herself, needs to be aware that the person has stored important and confidential information on an online platform and the demise of the person has to be informed/communicated to the online platform by them so that the data can be transmitted to the designated recipients. Therefore the designated recipients will have to be informed by the person of the existence of such an account on an online platform. The fact that other people would be aware that the person has stored important information on an online platform, they may try to access the important data even while the person is alive and this may lead to various complications. Also, in a few other technologies, the intended recipients would be prior intimated before the death of the person that he/she is one of the intended recipients of the confidential data maintained/stored by the person on the online platform and so the intended recipients may try to access the important data even while the person is alive. Another drawback of the existing technologies is that the important and confidential data is sent to the personalized digital accounts of the designated recipients directly and thus can be read by someone other than the designated recipient who has access to the personalized digital account of the designated recipient. Therefore there is a high risk of the important and confidential data being leaked to other unintended recipients.

In the light of the aforementioned discussion, there exists a need to provide personalized and confidential data management and sharing services for sharing the personalized and confidential data with the intended recipients designated by the registered subscriber at the right time i.e. upon the death of the registered subscriber or after a predetermined time period after the demise of the registered subscriber, as defined by the registered subscriber. This invention solves such problems and has invented a method to overcome the abovementioned limitations by making sure that no other party needs to be aware of the person having such an account, thereby increasing its security and reducing the scope for the important data being accessed prematurely. This invention has also laid out measures which increase the chances of the important data being accessed only by the designated recipients, thereby tightening the secrecy of the data by first having a video conference with the designated recipients and later comparing the image captured during the video conference with the one uploaded by the subscriber and only after the two images match and the identity of the recipient is confirmed, transmitting a password to the mobile number of the designated recipients which would be required to access the link transmitted to the personalized digital account of the designated recipients to view the important and confidential data of the demised person i.e. the registered subscriber. Also, the procedure of confirming the demise of the subscriber involves a verification call to the subscriber and the affiliates and also a physical verification at the residence of the subscriber.

BRIEF SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A more complete appreciation of the present invention and the scope thereof can be obtained from the accompanying drawings which are briefly summarized below and the following detailed description of the presently preferred embodiments.

An exemplary objective of the present disclosure is to enable the subscriber to designate one or more recipients to view and download the personalized and confidential data entered/uploaded by the subscriber.

Another exemplary objective of the present disclosure is that the designated recipients have no idea of the subscriber designating them as the intended recipients to view or download the personalized and confidential data on demise of the subscriber.

Still another exemplary objective of the present disclosure is that the personalized and confidential data management and sharing system transmits a password to the designated recipients only after the demise of the subscriber, thereby leaving no scope for the recipients to have knowledge of the existence of such an account of the subscriber and thus insuring that the personalized and confidential data remains secretive until the death of the subscriber.

Still another exemplary objective of the present disclosure is that the subscriber needs to upload or provide photographs of the designated recipients while designating the recipients for the personalized and confidential data. The designated recipients need to participate in the designated recipient confirmation session to prove their identity by participating in a video conference. The image captured during the video conference is compared with the photographs of the recipients provided by the subscriber while designating the recipients for the personalized and confidential data to confirm the identity of the recipient for viewing/downloading the personalized and confidential data.

Exemplary embodiments of the present disclosure are directed towards a method for providing personalized and confidential data management and sharing services. According to a first aspect, the method includes enabling an individual to register with a personalized and confidential data management and sharing system to become a subscriber. The subscriber can enter and upload personalized and confidential data and designate a plurality of recipients for receiving a part of the personalized and confidential data or complete personalized and confidential data upon the demise of the subscriber. The subscriber can classify the personalized and confidential data and choose which part of the data is transmitted to whom. For example, the subscriber can decide to transmit Data A to persons X, Y and Z, Data B to persons W and X and Data C only to person Z and the like. The personalized and confidential data entered/uploaded by the subscriber can be in the form of written words/text, scanned documents, media files like audio and video files and the like.

According to the first aspect, the method includes cryptographically encrypting the personalized and confidential data uploaded/entered by the subscriber on/in the personalized and confidential data management and sharing system.

According to the first aspect, the method includes dynamically determining the existence of a subscriber by tracking the visiting/login history of the subscriber into the subscriber account provided by the personalized and confidential data management and sharing system at regular intervals of time.

According to the first aspect, the method includes transmitting a plurality of communication messages to the personalized digital account and/or contact number of the subscriber for a predetermined number of times upon identifying a subscriber not logging in to the subscriber account for a predetermined time period. The subscriber is required to reply to the plurality of communication messages for confirming the existence of the subscriber.

According to the first aspect, the method includes establishing a voice call with a contact number of the subscriber and/or affiliates upon the subscriber not replying to the plurality of communication messages for a predetermined time-frame. The affiliates may include a list of contact persons along with their contact details, designated by the subscriber, who will be contacted by the personalized and confidential data management and sharing system team to ascertain the demise of the subscriber at the appropriate time.

According to the first aspect, the method includes transmitting the personalized and confidential data of the subscriber to a plurality of designated recipients upon confirming the demise of the subscriber or after a predetermined time period after the demise of the subscriber, as defined by the subscriber.

According to the second aspect, the system for providing personalized and confidential data management and sharing services is disclosed. According to the second aspect, the system includes a subscriber profile and designated recipients and affiliates details management unit. The subscriber profile and designated recipients and affiliates details management unit is further configured to manage the profile of the subscriber, the details of the affiliates and the designated recipients. The subscriber may enter/upload personalized and confidential data, provide contact details of affiliates and designate recipients for receiving personalized and confidential data on the demise of the subscriber.

According to the second aspect, the system includes a database unit for storing the personalized and confidential data of the subscriber.

According to the second aspect, the system includes a history tracking unit for dynamically determining the existence of a subscriber by tracking the visiting/login history of the subscriber into the subscriber account at regular intervals of time.

According to the second aspect, the system includes a dynamic message triggering unit for transmitting a plurality of communication messages to the personalized digital account and/or contact number of the subscriber for a predetermined number of times upon identifying a subscriber not logging in to the subscriber account for a predetermined time period. The subscriber is required to reply to the plurality of communication messages for confirming the existence of the subscriber. A voice call is established with a contact number of the subscriber and/or affiliates designated by the subscriber to confirm the existence/demise of the subscriber upon receiving no response to the plurality of communication messages for a predetermined time-frame. Upon confirming the demise of the subscriber a secured link is sent to the personalized digital account of the designated recipients which can be accessed by a password sent to the contact number/mobile number of the designated recipients. After accessing the secured link, the designated recipients will be informed/briefed to participate in a designated recipient confirmation session to prove their identity through video conference. The designated recipients need to participate in the designated recipient confirmation session to prove their identity by participating in a video conference through a video conference unit. The image captured during the video conference is compared with the photographs of the designated recipients provided by the subscriber while designating the recipients to confirm the identity of the designated recipients. The video conferencing unit allows the designated recipients to participate in the designated recipient confirmation session through a video conference to confirm their identity before transmitting the personalized and confidential data to the designated recipients. Thus, upon successfully confirming the demise of the subscriber and confirming the identity of the designated recipients through video conference, a secured link is sent to the personalized digital account of the designated recipients for viewing or downloading the personalized and confidential data of the subscriber stored in the database unit which can be accessed with a password sent to the contact number/mobile number of the designated recipients. The personalized and confidential data may also be transmitted to the designated recipients electronically as an email or a message or as a physical copy.

BRIEF DESCRIPTION OF DRAWINGS

The above-mentioned and other features and advantages of this present disclosure, and the manner of attaining them, will become more apparent and the present disclosure will be better understood by reference to the following description of embodiments of the present disclosure taken in conjunction with the accompanying drawings, wherein.

DETAILED DESCRIPTION

Figure 1:
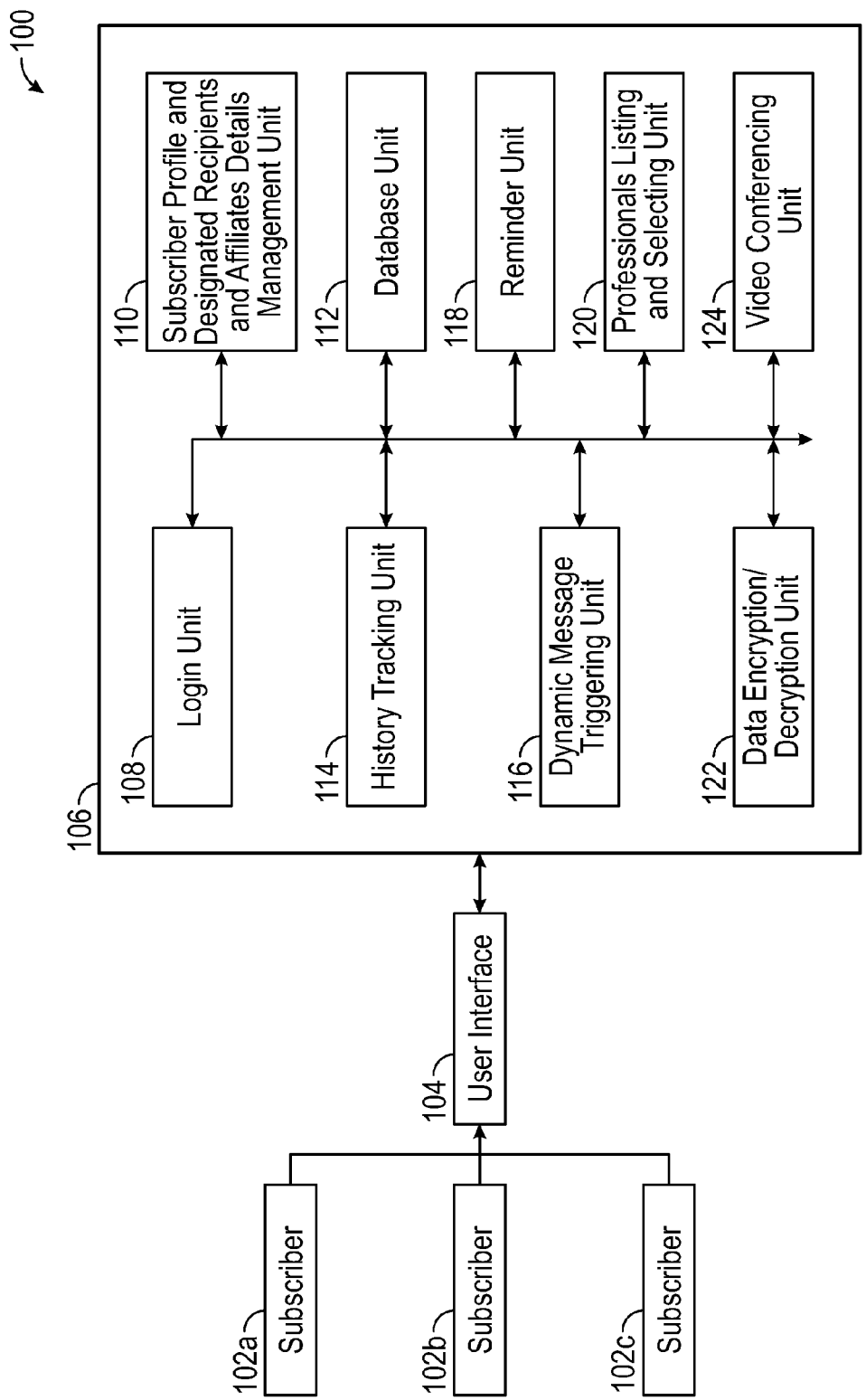
FIG. 1 is a diagram depicting a personalized and confidential data management and sharing system.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another. For a better understanding, components of the described embodiment are labeled with three digit component numbers. In general, the same first digit is used throughout the entire component numbers numbered and labeled within a figure. Like components are designated by like reference numerals throughout the various figures.

Referring now to FIG. 1, the diagram 100 depicting a personalized and confidential data management and sharing system. According to a non limiting exemplary embodiment of the present disclosure, the subscribers 102a, 102b and 102c communicate with a personalized and confidential data management and sharing system 106 through a user interface 104. The personalized and confidential data management and sharing system 106 includes a login unit 108, a subscriber profile and designated recipients and affiliates details management unit 110, a database unit 112, a history tracking unit 114, a dynamic message triggering unit 116, a reminder unit 118, a data encryption/decryption unit 122, a professionals listing and selecting unit 120 and a video conferencing unit 124.

In accordance with a non limiting exemplary embodiment of the present disclosure, an individual is enabled to register with the personalized and confidential data management and sharing system 106 to become a registered subscriber by providing personal information which may include but not limited to name, personalized digital account (email), contact number and the like and also the contact details of various affiliates. The affiliates specified by the subscriber may include a list of contact persons who will be contacted by the personalized and confidential data management and sharing system team to ascertain the demise of the subscriber at the appropriate time. The personal information corresponding to the subscriber and the affiliates is stored in the subscriber profile and designated recipients and affiliates details management unit 110. The subscriber can upload/enter personalized and confidential data on/in the personalized and confidential data management and sharing system 106 and designate different recipients to receive a part of the personalized and confidential data or complete personalized and confidential data. The subscriber needs to upload or provide photographs of the designated recipients while designating the recipients to view/download the personalized and confidential data. The photographs of the recipients uploaded or provided by the subscriber are stored or maintained in the subscriber profile and designated recipients and affiliates details management unit 110. The subscriber can classify the personalized and confidential data and choose which part of the data is transmitted to whom. For example, the subscriber can decide to transmit Data A to persons X, Y and Z, Data B to persons W and X and Data C only to person Z and the like. The data encryption/decryption unit 122 is configured to cryptographically encrypt the content uploaded by the subscriber and storing in a database unit 112. The personalized and confidential data is encrypted and can be viewed/received by the designated recipients upon confirming the demise of the subscriber after following a predetermined process of confirming the demise of the subscriber. The login unit 108 enables the subscriber to login to the account provided by the personalized and confidential management system 106.

According to a non limiting exemplary embodiment of the present disclosure, the history tracking unit 114 included in the personalized and confidential data management and sharing system 106 is used to dynamically determine the existence of the subscriber by tracking the visiting/login history of the subscriber into the subscriber account at regular intervals of time. Then, if the subscriber is not found to be logging into the subscriber account for a predetermined time period, multiple communication messages are transmitted by the dynamic message triggering unit 116 to the personalized digital account of the subscriber for a predetermined number of times. Thus, the subscriber is required to reply to the communication messages transmitted by the personalized and confidential data management and sharing system 106 or log in to the subscriber account for confirming the existence of the subscriber. The subscriber may reply to the personalized and confidential data management and sharing system 106 by an email or by transmitting a text message or by establishing a voice call to the team of the data management and sharing system 106 and the like.

In accordance with a non limiting exemplary embodiment of the present disclosure, the subscriber not responding to any communication messages like emails or SMS sent to the subscriber's contact number, the dynamic message triggering unit 116 or the team of the system 106 establishes a voice call with a contact number of the subscriber and with the affiliates specified by the subscriber to confirm the existence/demise of the subscriber. According to an exemplary aspect, a physical confirmation/or any other suitable method is also made by the team of system 106 for confirming the demise of the subscriber.

According to a non limiting exemplary aspect of the present disclosure, upon ascertaining the demise of the subscriber, a secured link is sent to the personalized digital account of the designated recipients which can be accessed by a password sent to the contact number/mobile number of the designated recipients. After accessing the secured link, the designated recipients will be informed/briefed to participate in a designated recipient confirmation session to prove their identity through video conference. The designated recipients need to participate in the designated recipient confirmation session to prove their identity by participating in a video conference through a video conference unit 124. The image captured during the video conference is compared with the photographs of the designated recipients provided by the subscriber while designating the recipients to confirm the identity of the designated recipients. The video conferencing unit 124 allows the designated recipients to participate in the designated recipient confirmation session through a video conference to confirm their identity before transmitting the personalized and confidential data to the designated recipients. Thus, upon successfully confirming the demise of the subscriber and confirming the identity of the designated recipients through video conference, a secured link is sent to the personalized digital account of the designated recipients for viewing or downloading the personalized and confidential data of the subscriber stored in the database unit 112 which can be accessed with a password sent to the contact number/mobile number of the designated recipients. The type of communication medium may further include but not limited to an electronic mail, a message, a print of the documents and the like.

According to a non limiting exemplary embodiment of the present disclosure, the personalized and confidential data management and sharing system 106 further includes a reminder unit 118 to enable the subscriber to set one or more personal reminders which may include but not limited to birthday dates, anniversary dates, occasions, meetings, conferences, expiry date of health insurance or life insurance or insurance date of vehicles and the like. The defined personal reminders may be sent to the digital account of the subscriber or any other person as defined by the subscriber at a predetermined time. The personalized and confidential data management and sharing system 106 also further enables the subscriber to receive consultation from various professionals through the professionals listing and selecting unit 120. The list of professionals may include but not limited to doctors, lawyers, psychiatrists, counselors and the like. The subscriber may receive real time consultation or advice through video conference, interacting through chat, electronic mail or text message, etc.

Figure 2:
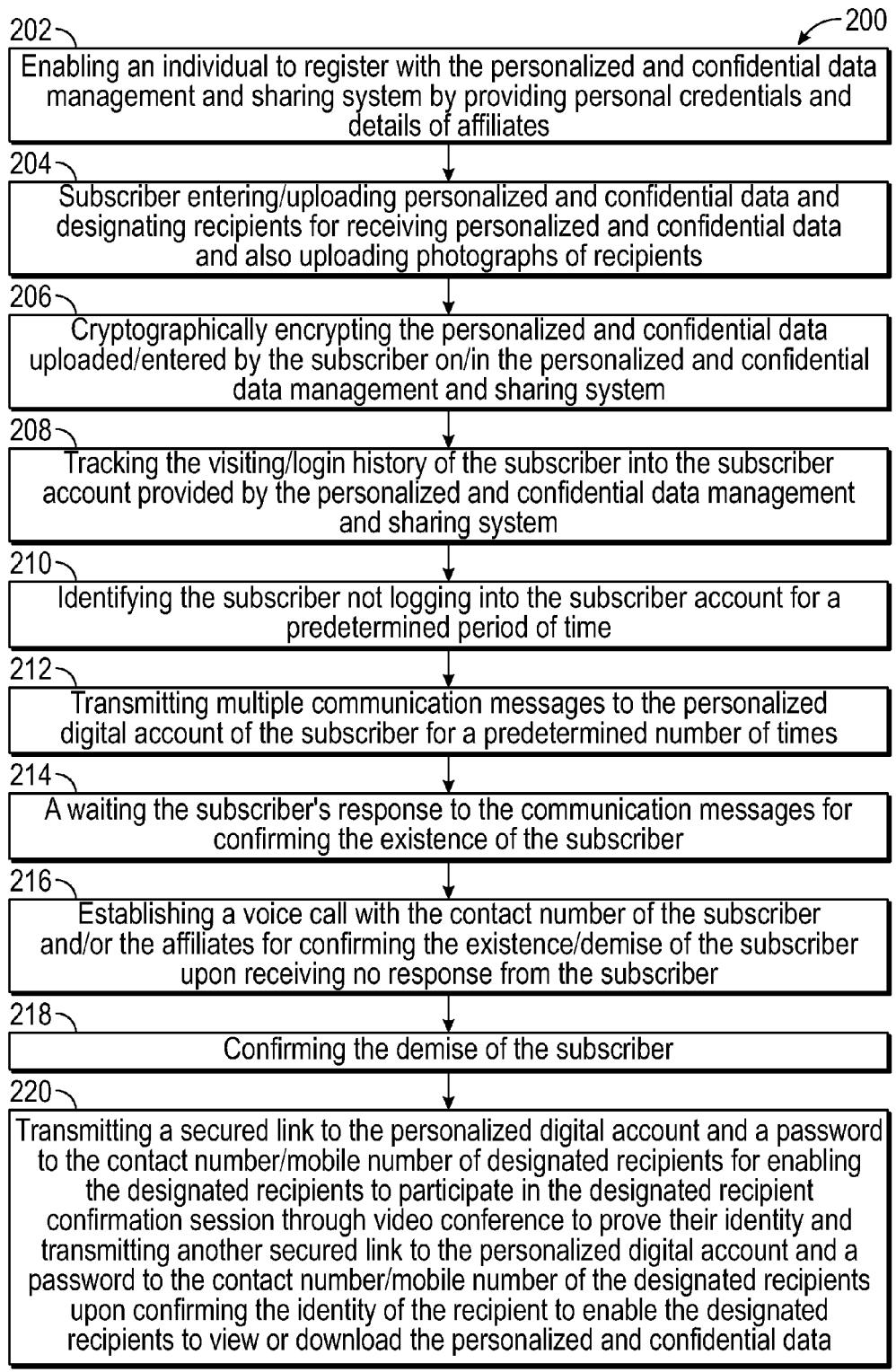
FIG. 2 is a flow diagram depicting a method for providing personalized and confidential data management and sharing services to a subscriber.

Referring now to FIG. 2, the flow diagram 200 depicting a method for providing personalized and confidential data management and sharing services to a subscriber. According to a non limiting exemplary embodiment of the present disclosure, the method starts at step 202 by an individual providing personal credentials and contact details of affiliates to register with the personalized and confidential data management and sharing system to become a subscriber. Next at step 204 the subscriber is enabled to enter/upload personalized and confidential data and designate recipients for receiving the personalized and confidential data and also upload or provide photographs of the designated recipients. The designated recipients may receive a part of personalized and confidential data of the subscriber or complete personalized and confidential data of the subscriber upon the demise of the subscriber. The subscriber can classify the personalized and confidential data and choose which part of the data is transmitted to whom. For example: the subscriber can decide to transmit Data A to persons X, Y and Z, Data B to persons W and X and Data C only to person Z and the like.

In accordance with a non limiting exemplary embodiment of the present disclosure, at step 206 the personalized and confidential data uploaded/entered by the subscriber to the personalized and confidential data management and sharing system is cryptographically encrypted. Next, at step 208, the visiting/login history of the subscriber is tracked by the personalized and confidential data management and sharing system to determine the existence of the subscriber at regular intervals of time. Further at step 210, the subscriber not logging into the subscriber account for a predetermined period of time is identified and multiple communication messages are transmitted to the digital account of the subscriber for a predetermined number of times at step 212.

According to a non limiting exemplary embodiment of the present disclosure, at step 214 the system awaits subscriber's response to the multiple communication messages transmitted by the personalized and confidential data management and sharing system for confirming the existence of the subscriber. The subscriber may reply to the personalized and confidential data management and sharing system by an email or by transmitting a text message or by establishing a voice call to the team of the personalized and confidential data management and sharing system and the like. Next, at step 216, a voice call (telephonic call) is established with a contact number of the subscriber and/or the affiliates for confirming the existence/demise of the subscriber upon not receiving any response to the communication messages. Next at step 218, the demise of the subscriber is confirmed and at step 220 a secured link is sent to the personalized digital account of the designated recipients which can be accessed by a password sent to the contact number/mobile number of the designated recipients. After accessing the secured link, the designated recipients will be informed/briefed to participate in a designated recipient confirmation session to prove their identity through video conference. The designated recipients need to participate in the designated recipient confirmation session to prove their identity by participating in a video conference through a video conference unit. The image captured during the video conference is compared with the photographs of the designated recipients provided by the subscriber while designating the recipients to confirm the identity of the designated recipients. The video conferencing unit allows the designated recipients to participate in the designated recipient confirmation session through a video conference to confirm their identity before transmitting the personalized and confidential data to the designated recipients. Thus, upon successfully confirming the demise of the subscriber and confirming the identity of the designated recipients through video conference, a secured link is sent to the personalized digital account of the designated recipients for viewing or downloading the personalized and confidential data of the subscriber stored in the database unit which can be accessed with a password sent to the contact number/mobile number of the designated recipients. The type of communication medium may further include but not limited to an electronic mail, a message, a print of the documents and the like.

Figure 3:
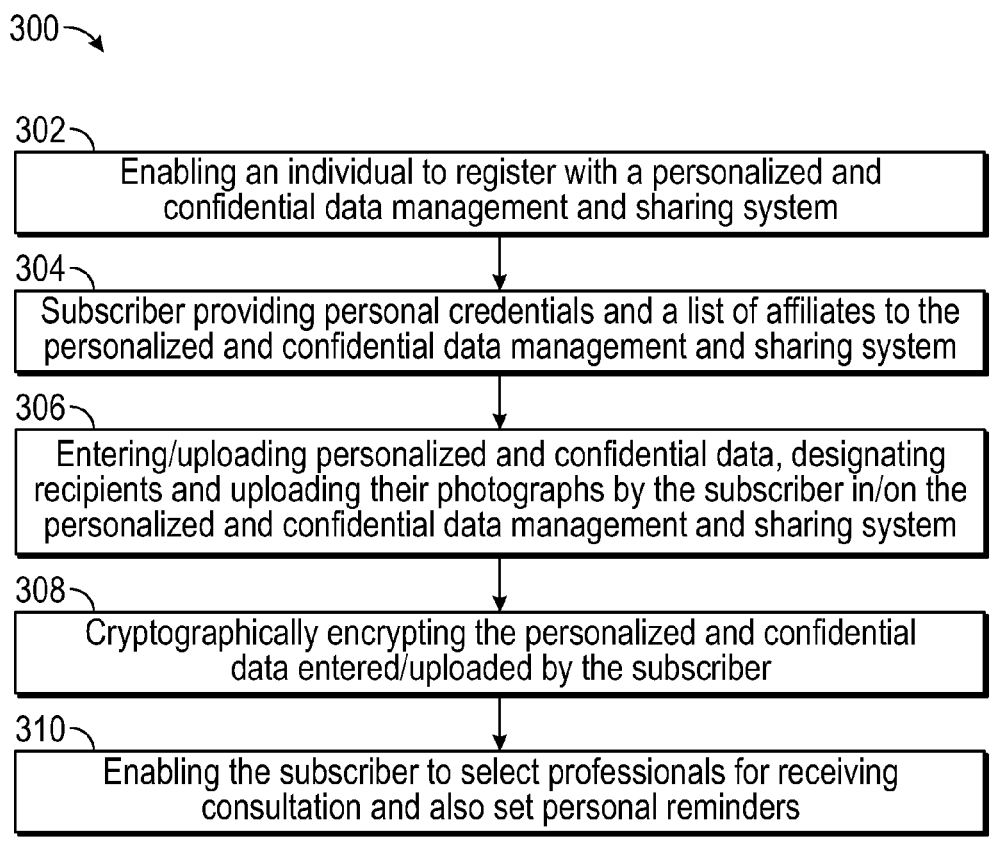
FIG. 3 is a flow diagram depicting a method of registering an individual to become a subscriber.

Referring now to FIG. 3, the flow diagram 300 depicting a method of registering an individual to become a subscriber. According to a non limiting exemplary embodiment of the present disclosure, the method starts at step 302 by enabling an individual to register with a personalized and confidential data management and sharing system to become a subscriber. Next, at step 304, the subscriber is required to provide the personalized credentials (which may include but not limited to name, personalized digital account (email), contact number and the like) and list down contact details of affiliates. Affiliates may include list of contact persons along with their contact details who will be contacted by the personalized and confidential data management and sharing system team to ascertain the demise of the subscriber at the appropriate time.

In accordance with a non limiting exemplary embodiment of the present disclosure, at step 306, the subscriber uploads/enters personalized and confidential data on/in the personalized and confidential data management and sharing system and designates recipients and also uploads photographs of the designated recipients to receive a part of the personalized and confidential data or complete personalized and confidential data upon the demise of the subscriber as described in FIG. 1 and FIG. 2. Next at step 308 the personalized and confidential data uploaded/entered by the subscriber is encrypted cryptographically. On the demise of the subscriber the personalized and confidential data is transmitted to the designated recipients as disclosed in FIG. 1 and FIG. 2. Further at step 310, the subscriber is enabled to select the professional and set reminders. On selecting the professional, the subscriber may receive consultation. The list of professionals may include but not limited to doctors, lawyers, psychiatrists, counselors and the like. The subscriber may receive real time consultation or advice through video conference, interacting through chat, electronic mail or text message, and the like. The subscriber can also set one or more personal reminders which may include but not limited to birthday dates, anniversary dates, occasions, meetings, conferences, expiry date of health insurance or life insurance or insurance date of vehicles and the like. The defined personal reminders may be sent to the digital account of the subscriber or any other person as defined by the subscriber at a predetermined time.

Figure 4:
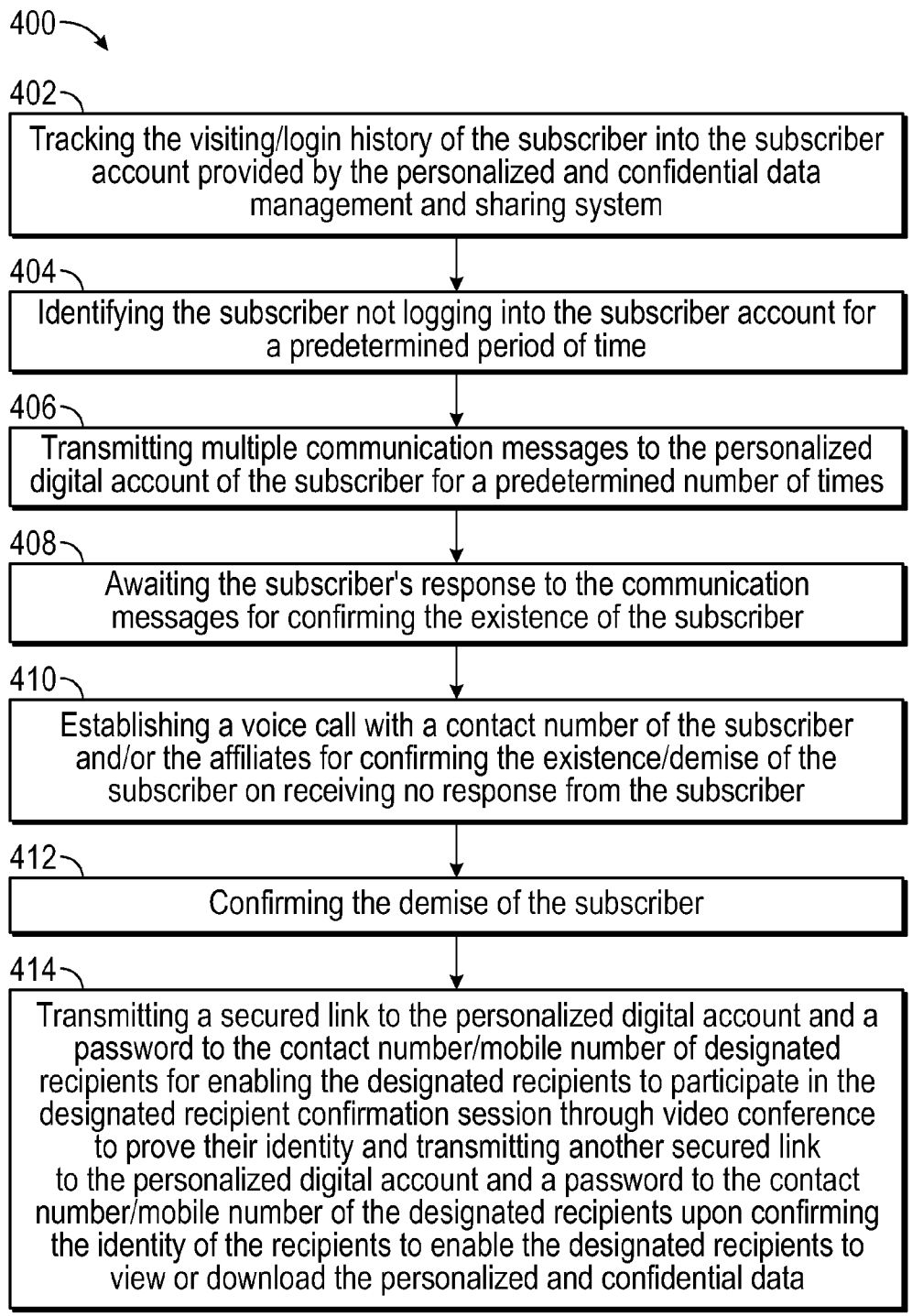
FIG. 4 is flow diagram depicting a method for confirming the demise of the subscriber.

Referring now to FIG. 4, the flow diagram 400 depicting a method for confirming the demise of the subscriber. According to a non limiting exemplary embodiment of the present disclosure, the method starts at step 402 by tracking the visiting/login history of the subscriber into the subscriber account provided by the personalized and confidential data management and sharing system to determine the existence of the subscriber at regular intervals of time.

In accordance with a non limiting exemplary embodiment of the present disclosure, at step 404, the subscriber not logging into the subscriber account for a predetermined period of time is identified. Next at step 406 multiple communication messages are transmitted to the digital account (email) of the subscriber for a predetermined number of times. Next at step 408, the subscriber's response to the communication messages is awaited for confirming the existence of the subscriber. The subscriber may reply to the personalized and confidential data management and sharing system by sending an email or by sending a text message or by establishing a voice call with the team of the personalized and confidential data management and sharing system and the like. At step 410, a voice call is established with a contact number of the subscriber and/or the affiliates by the team of the personalized and confidential data management and sharing system for confirming the existence/demise of the subscriber upon receiving no response from the subscriber to the communication messages for a predetermined time period. According to an exemplary aspect, a team member of the personalized and confidential data management and sharing system personally visits the residence of the subscriber to confirm the demise of the subscriber before transmitting the personalized and confidential data of the subscriber to the designated recipients. Next at step 412 the demise of the subscriber is confirmed. Further at step 414*a* secured link is sent to the personalized digital account of the designated recipients which can be accessed by a password sent to the contact number/mobile number of the designated recipients. After accessing the secured link, the designated recipients will be informed/briefed to participate in a designated recipient confirmation session to prove their identity through video conference. The designated recipients need to participate in the designated recipient confirmation session to prove their identity by participating in a video conference through a video conference unit. The image captured during the video conference is compared with the photographs of the designated recipients provided by the subscriber while designating the recipients to confirm the identity of the designated recipients. The video conferencing unit allows the designated recipients to participate in the designated recipient confirmation session through a video conference to confirm their identity before transmitting the personalized and confidential data to the designated recipients. Thus, upon successfully confirming the demise of the subscriber and confirming the identity of the designated recipients through video conference, a secured link is sent to the personalized digital account of the designated recipients for viewing or downloading the personalized and confidential data of the subscriber stored in the database unit which can be accessed with a password sent to the contact number/mobile number of the designated recipients. The type of communication medium may further include but not limited to an electronic mail, a message, a print of the documents and the like.

Figure 5:
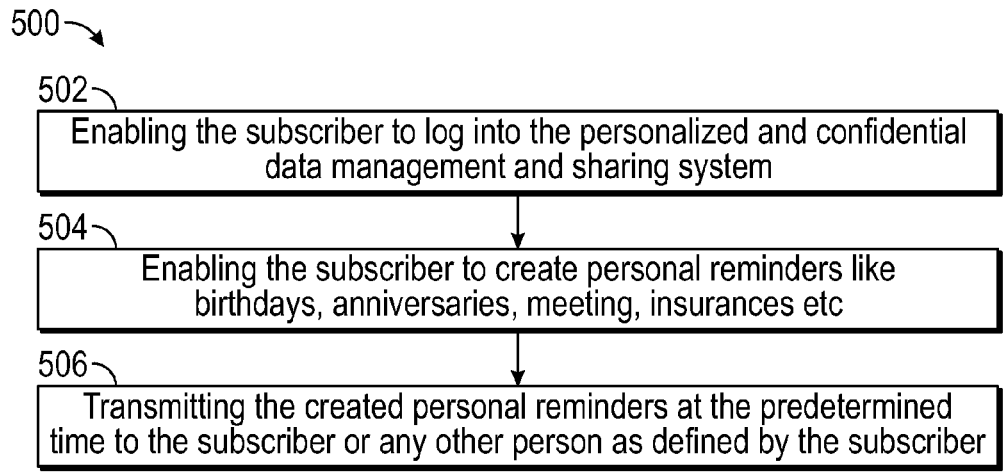
FIG. 5 is a flow diagram depicting a method of subscriber setting reminders using the reminder unit.

Referring now to FIG. 5, the flow diagram 500 depicting a method of subscriber setting reminders using the reminder unit. According to a non limiting exemplary embodiment of the present disclosure, the method starts at step 502 by enabling a subscriber to log into the personalized and confidential data management and sharing system. Next at step 504, the subscriber can create or set multiple personal reminders which may include but not limited to birthday dates, anniversary date, occasions, meetings, conferences, expiry date of health insurance or life insurance or insurance date of vehicles and the like. Further at step 506, the created personal reminders are sent to the digital account of the subscriber or any other person as defined by the subscriber at the predetermined time. The reminders may also be sent to the contact number of the subscriber or any other person as defined by the subscriber as text message (SMS).

Figure 6:
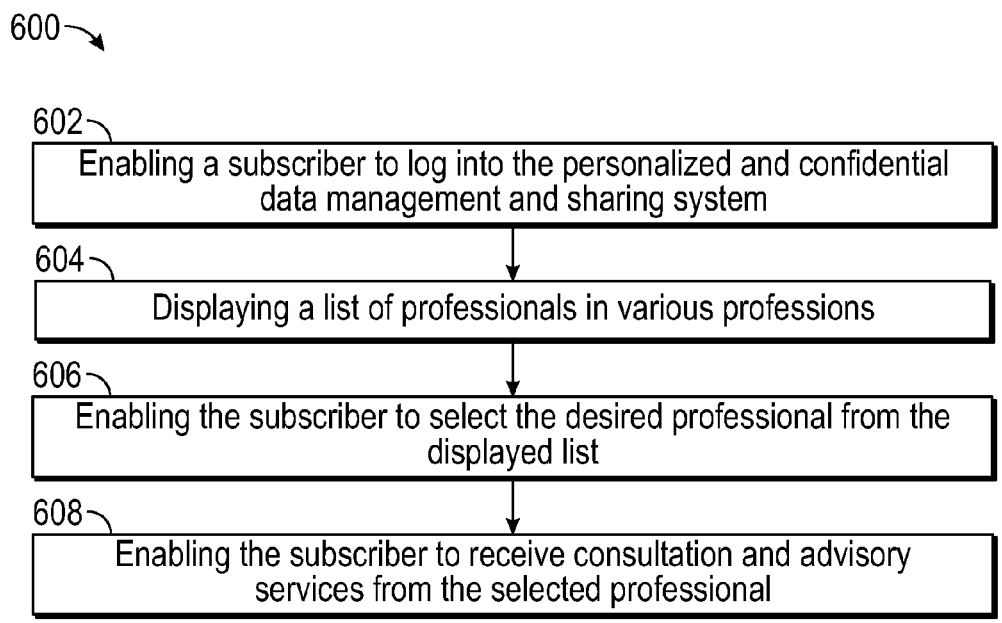
FIG. 6 is a flow diagram depicting a method of subscriber receiving consultation from various professionals.

Referring now to FIG. 6, the flow diagram 600 depicting a method of the subscriber receiving consultation from various professionals. According to a non limiting exemplary embodiment of the present disclosure, the method starts at step 602 by enabling a subscriber to log into the personalized and confidential data management and sharing system. Next at step 604 a list of professionals are displayed and a professional is selected by the subscriber from the displayed list at step 606. Further at step 608, the subscriber receives consultation and advisory services from the selected professional. The list of professionals may include but not limited to doctors, lawyers, psychiatrists, counselors and the like. The subscriber may receive real time consultation or advice through video conference, interacting through chat, electronic mail or text message, and the like.

While specific embodiments of the disclosure have been shown and described in detail to illustrate the inventive principles, it will be understood that the disclosure may be embodied otherwise without departing from such principles.

What is claimed is:

1. A method for providing personalized and confidential data management and sharing services, the method comprising:

enabling an individual to register with a personalized and confidential data management and sharing system by providing personal credentials and a list of plurality of affiliates to become a subscriber, whereby the subscriber is enabled to enter/upload personalized and confidential data and designate a plurality of recipients and upload photographs of the plurality of designated recipients for receiving a part of the personalized and confidential data or complete personalized and confidential data;

cryptographically encrypting the personalized and confidential data entered/uploaded by the subscriber on/in the personalized and confidential data management and sharing system;

dynamically determining an existence of the subscriber by tracking a visiting/login history of the subscriber into a subscriber account provided by the personalized and confidential data management and sharing system at regular intervals of time;

transmitting a plurality of communication messages to a personalized digital account of the subscriber for a predetermined number of times upon identifying the subscriber not logging in to the subscriber account for a predetermined time period;

awaiting a response from the subscriber to the plurality of communication messages to confirm the existence of the subscriber;

establishing a voice call with a contact number of the subscriber and/or affiliates by the team of personalized and confidential data management and sharing system to reconfirm the existence of the subscriber upon receiving no response from the subscriber to the plurality of communication messages; and upon ascertaining the demise of the subscriber, transmitting the personalized and confidential data of the subscriber to the designated recipients by transmitting a secured link to the personalized digital account of the plurality of designated recipients for logging into the personalized and confidential data management and sharing system to view/download the personalized and confidential data with a password provided to access the personalized and confidential data, whereby an identity of the plurality of recipients is determined by conducting a designated recipient confirmation session through a video conference to confirm their identity and comparing an image captured during the video conference with the photographs of the plurality designated recipients provided by the subscriber while designating the plurality of recipients.

2. The method of claim 1 further comprising a step of subscriber providing own personalized digital account, a contact number and other personal credentials while registering with the personalized and confidential data management and sharing system and contact details of the plurality of affiliates.

3. The method of claim 1 further comprising a step of displaying to the subscriber a list of professionals in at least one predetermined profession and receive consultation and advisory services.

4. The method of claim 1 further comprising a step of enabling the subscriber to designate the plurality of recipients by providing their personalized digital account and contact number to receive personalized and confidential data upon the demise of the subscriber or after a predetermined time after the demise of the subscriber.

5. The method of claim 1 further comprising a step of enabling the subscriber to set one or more personal reminders to be received to the provided personalized digital account.

6. The method of claim 1 further comprising a step of physical confirmation to confirm the demise of the subscriber.

7. A personalized and confidential data management and sharing system comprising:

a subscriber profile and designated recipients and affiliates details management unit configured to manage a profile of the subscriber, manage details corresponding to a plurality of affiliates and a plurality of recipients designated by the subscriber and photographs of the plurality of recipients, whereby the subscriber uploads/enters personalized and confidential data and designates the plurality of recipients for receiving the personalized and confidential data on at least one of: a demise of the subscriber; and/or after a predetermined time period after the demise of the subscriber, as defined by the subscriber;

a database unit for storing the personalized and confidential data of the subscriber, the recipients designated by the subscriber and the list of the plurality of affiliates;

a history tracking unit for dynamically determining an existence of the subscriber by tracking a visiting/login history of the subscriber in to a subscriber account at regular intervals of time; and a dynamic message triggering unit for transmitting a plurality of communication messages to a personalized digital account of the subscriber for a predetermined number of times upon identifying the subscriber not logging in to the subscriber account for a predetermined time period and transmitting the personalized and confidential data of the subscriber to the designated recipients by transmitting a secured link to the personalized digital account of the plurality of recipients designated by the subscriber for logging into the personalized and confidential data management and sharing system to view/download the personalized and confidential data, whereby the designated recipient is provided with a password to access the personalized and confidential data upon confirming the demise of the subscriber;

a data encryption and decryption unit for encrypting the personalized and confidential data uploaded/entered by the subscriber and decrypting the personalized and confidential data for enabling the plurality of designated recipients to view/download the personalized and confidential data; and a video conferencing unit for enabling the plurality of recipients to participate in a designated recipient confirmation session through a video conference to confirm their identity, whereby an image captured during the video conference is compared with the photographs of the plurality of designated recipients provided by the subscriber while designating the plurality of recipients.

8. The system of claim 7 further comprising a reminder unit for enabling the subscriber or any other person to receive one or more reminders set by the subscriber.

9. The system of claim 7 further comprising a professional listing and selection unit for enabling the subscriber to select at least one expert in a predetermined profession and receive consultation and advisory services from the professional.

\* \* \* \* \*